Patented Jan. 24, 1939

2,144,704

UNITED STATES PATENT OFFICE 2,144,704

INTERMEDIATE FOR WATER-INSOLUBLE AZO DYESTUFFS

Friedrich Muth, Leverkusen-I. G. Werk, Germany, assignor to General Aniline Works, Inc., New York, N. Y., a corporation of Delaware No Drawing. Application March 16, 1936, Serial No. 69,221. In Germany March 20, 1935

4 Claims. (Cl. 260—315)

The present invention relates to new dyestuff intermediates suitable for the manufacture of waterinsoluble azodyestuffs, more particularly it relates to arylamides of the general formula:

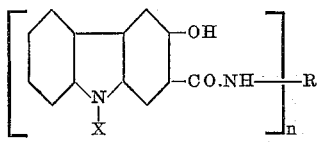

wherein X stands for hydrogen or a hydrocarbon radical, such as of the alkyl, aralkyl or aryl series, for example methyl, ethyl, phenyl and benzyl, R stands for an aromatic radical which may bear substituents not inducing solubility in water or aqueous alkalies, for example R may stand for a benzene or naphthalene nucleus, which may bear suitable substituents, such as alkyl, alkoxy, the nitro group, halogen, cyanogen, $\omega$-trifluor-methyl, and $n$ stands for one of the numbers 1 and 2.

My new dyestuff intermediates are in general colorless to yellowish colored substances, insoluble in water, soluble in organic solvents and aqueous or alcoholic caustic alkalies, and are valuable intermediates for the manufacture of waterinsoluble azodyestuffs according to the ice color method wherein said intermediates are coupled with a suitable diazotization component; in substance or on the fiber in the same manner as is disclosed for the preparation of waterinsoluble azodyestuffs from similar 2-hydroxycarbazole-3-carboxylic acid arylamides in Example 5 of British Patent 372,301.

My new arylamides are obtainable by condensing 3-hydroxycarbazole-2-carboxylic acid or its derivatives substituted in the cyclic imino group by a hydrocarbon radical in the form of their acid chlorides or esters, with aromatic monamines or diamines, or by condensing the free carboxylic acids with the corresponding aryl esters of isocyanic acid.

The starting 3-hydroxycarbazole-2-carboxylic acid or the N-substitution products thereof are obtained by treating the corresponding 3-hydroxycarbazole compound with carbon dioxide at elevated temperature and superatmospheric pressure in the presence of an alkali.

The invention is illustrated by the following examples, but is not restricted thereto:

Example 1.—227 grams of 3-hydroxycarbazole-2-carboxylic acid and 165 grams of o-methoxy-p-chloraniline are dissolved or suspended in about 5 litres of toluene. At 60–70° C. about 70 grams of phosphorus trichloride are added and then the solution is slowly heated to boiling and boiled until the evolution of hydrochloric acid has ceased. The solution is rendered alkaline with sodium carbonate solution, and the toluene and the excess of amine are distilled off by means of steam. The remainder is purified by dissolving in dilute aqueous caustic soda solution and by precipitating with acid. Melting point 293° C. The arylamide corresponds to the following formula:

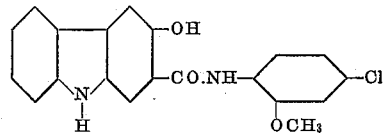

In an analogous manner, with aminohydroquinone dimethylether a yellow colored arylide of a higher melting point than 300° C. is obtained, which corresponds to the following formula:

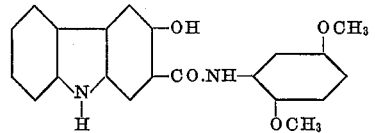

In an analogous manner with $\alpha$- or $\beta$-naphthylamine or with 4.4'-diamino-3.3'-dimethoxydiphenyl there are obtained yellowish colored arylides of higher melting points than 300° C.

The 3-hydroxycarbazole-2-carboxylic acid is obtained by the treatment with carbon dioxide of 3-hydroxycarbazole (Berichte der Deutschen Chemischen Gesellschaft 34, 1683). It crystallizes from alcohol in strongly yellow colored and compact crystals of melting point 287° C.

Example 2.—241 grams of 9-methyl-3-hydroxycarbazole-2-carboxylic acid are condensed in an analogous manner to that described in Example 1 with the calculated quantity of aminohydroquinone dimethylether and then worked up. The arylide corresponding to the following formula:

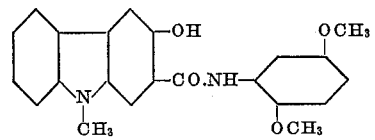

crystallizes from chlorobenzene in strongly greenish yellow colored needles of melting point 240° C.

The 9-methyl-3-hydroxycarbazole-2-carboxylic acid is obtained in the following manner:—

3-methoxycarbazole (Annalen der Chemie 359, 79) is methylated to the 9-methyl-3-methoxycarbazole (colorless needles from alcohol, of melting point 98° C.) and this, for instance according to the process of U. S. Patent No. 1,999,341, is partly demethylated to the 9-methyl-3-hydroxycarbazole (colorless needles from toluene, of melting point 145° C.). The 9-methyl-3-hydroxycarbazole-2-carboxylic acid obtainable by treatment with carbon dioxide crystallizes from toluene or pyridine in the presence of some alcohol in strongly yellow colored leaflets of melting point 265° C.

*Example 3.*—26 parts by weight of the chloride of 9-methyl-3-hydroxycarbazole-2-carboxylic acid and 12.2 parts by weight of 4.4′-diamino-3.3′-dimethoxydiphenyl are heated in 400 parts by weight of dimethylaniline on the water-bath. When the condensation is complete, the reaction mixture is rendered alkaline by the addition of aqueous soda solution, and after this the dimethylaniline is distilled off with steam. The arylide of the formula:

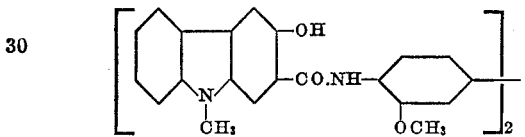

separated is filtered and purified by dissolving in warm aqueous soda solution, reprecipitating by the addition of dilute hydrochloric acid, separating, again dissolving in aqueous alcoholic caustic soda, introducing carbon-dioxide, filtering, precipitating with hydrochloric acid, filtering and drying.

I claim:

1. Arylamides of the general formula:

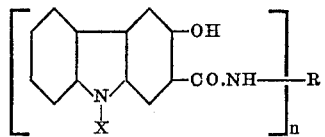

wherein X stands for a member selected from the group consisting of hydrogen and hydrocarbon radicals, R stands for a member of the group consisting of a benzene nucleus, a naphthalene nucleus and benzene and naphthalene nuclei substituted by a member of the group consisting of alkyl, alkoxy, nitro, halogen, cyanogen, and ω-trifluormethyl, the bond from the CO.NH being directly connected to a benzene nucleus of R, and n stands for one of the numbers 1 and 2.

2. The arylamide of the following formula:

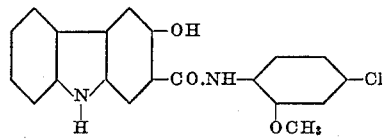

having the melting point 293° C.

3. The arylamide of the following formula:

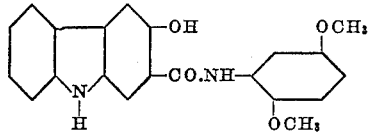

having a melting point of more than 300° C.

4. The arylamide of the following formula:

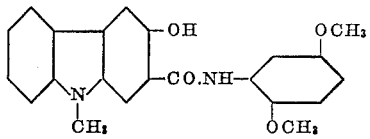

having the melting point 240° C.

FRIEDRICH MUTH.